(12) United States Patent
Kulczycki et al.

(10) Patent No.: US 9,459,787 B2
(45) Date of Patent: Oct. 4, 2016

(54) CONTROL KNOB

(75) Inventors: Jeffrey Kulczycki, Plymouth, MI (US); Scott A. Morrison, Howell, MI (US); Michael Schultz, Troy, MI (US)

(73) Assignee: Kelsey-Hayes Company, Livonia, MI (US)

( * ) Notice: Subject to any disclaimer, the term of this patent is extended or adjusted under 35 U.S.C. 154(b) by 1467 days.

(21) Appl. No.: 13/132,402

(22) PCT Filed: Dec. 2, 2009

(86) PCT No.: PCT/US2009/066308
§ 371 (c)(1),
(2), (4) Date: Jun. 2, 2011

(87) PCT Pub. No.: WO2010/065574
PCT Pub. Date: Jun. 10, 2010

(65) Prior Publication Data
US 2011/0240455 A1    Oct. 6, 2011

Related U.S. Application Data

(60) Provisional application No. 61/119,450, filed on Dec. 3, 2008.

(51) Int. Cl.
| | |
|---|---|
| H03K 17/94 | (2006.01) |
| G06F 3/0488 | (2013.01) |
| G06F 3/0354 | (2013.01) |
| G06F 3/0362 | (2013.01) |
| H01H 19/14 | (2006.01) |

(52) U.S. Cl.
CPC ......... *G06F 3/04883* (2013.01); *G06F 3/0362* (2013.01); *G06F 3/03547* (2013.01); *G06F 2203/0339* (2013.01); *H01H 19/14* (2013.01)

(58) Field of Classification Search
CPC ...................................... H03K 17/96
USPC ................ 341/20, 22, 33; 200/600
See application file for complete search history.

(56) References Cited

U.S. PATENT DOCUMENTS

| | | | | |
|---|---|---|---|---|
| 5,134,259 | A | * 7/1992 | Page, Jr. ............... | H01H 3/12 192/130 |
| 8,783,016 | B2 | * 7/2014 | Gonze ................ | F01N 3/0814 60/274 |
| 2003/0189493 | A1 | * 10/2003 | Klausner ............ | B62D 15/029 340/575 |
| 2006/0012584 | A1 | 1/2006 | Vassallo et al. | |
| 2007/0144175 | A1 | * 6/2007 | Sopko, Jr. ............. | F02B 39/10 60/605.1 |
| 2007/0152988 | A1 | 7/2007 | Levin et al. | |
| 2007/0210728 | A1 | * 9/2007 | Musser ................ | B60W 10/08 318/53 |
| 2007/0213891 | A1 | * 9/2007 | Musser ................ | B60K 6/46 701/22 |
| 2008/0004769 | A1 | * 1/2008 | Lenneman et al. ........ | 701/36 |
| 2008/0106227 | A1 | * 5/2008 | Gebert ................ | B60K 6/48 318/371 |
| 2008/0181459 | A1 | * 7/2008 | Martin et al. ........... | 382/103 |
| 2008/0196952 | A1 | * 8/2008 | Soliman ................ | B60K 6/48 180/65.25 |
| 2008/0202906 | A1 | 8/2008 | Schelbert et al. | |
| 2009/0009491 | A1 | * 1/2009 | Grivna ................ | G06F 3/033 345/184 |
| 2009/0325760 | A1 | * 12/2009 | Soliman .............. | B60K 6/365 477/98 |
| 2009/0326778 | A1 | * 12/2009 | Soliman .............. | B60K 6/442 701/84 |
| 2010/0162686 | A1 | * 7/2010 | Miyashita .............. | B60K 6/24 60/274 |

* cited by examiner

*Primary Examiner* — Amine Benlagsir
(74) *Attorney, Agent, or Firm* — Tarolli, Sundheim, Covell & Tummino LLP

(57) ABSTRACT

A control knob (10) includes a base (14) and a shaped wall (12). A plurality of sensor elements (32) are located within and circumferentially spaced around said shaped wall. Processor circuitry (40, 50) is connected to the plurality of sensor elements (32) for controlling an end-use device. The processor circuitry (40, 50) senses user touch commands on both sides of the shaped wall (12), and determines user desired commands based on the sensed user touch commands.

11 Claims, 3 Drawing Sheets

CONTROL KNOB

RELATED APPLICATION

This application claims priority from U.S. Provisional Application No. 61/119,450, filed Dec. 3, 2008, the subject matter of which is incorporated herein by reference.

TECHNICAL FIELD

The present invention relates to control knobs and is particularly directed to a touch-type control knob.

BACKGROUND

Control knobs, and in particular, mechanical rotary control knobs are known. Such rotary control Knobs are mechanically turnable and control things from simple. ON/OFF functions of devices, to selection of specific items like television stations, to infinitely controlled selections like volume of a radio. Such mechanical rotary control knobs have been found in many applications in vehicle control applications.

SUMMARY OF THE INVENTION

In accordance with one aspect of the present invention, a control knob comprises a base and a shaped wall. A plurality of sensor elements are located within and circumferentially spaced around said shaped wall. Processor circuitry is connected to said plurality of sensor elements for controlling an end-use device. The processor circuitry senses user touch commands on both sides of the shaped wall, and determines user desired commands based on the sensed user touch commands.

In accordance with one aspect of the present invention, a touch-type control knob comprises a base and a cylindrical wall. A plurality of capacitive sensor elements are provided within and circumferentially spaced around the cylindrical wall. Processor circuitry is connected to the plurality of capacitive sensor elements for controlling an end-use device. The processor circuitry senses user touch commands on both sides of the cylinder; and determines user desired commands based on the sensed user touch commands.

In accordance with another aspect of the present invention, a method is provided for controlling a knob comprising the steps of detecting finger position on the knob, detecting thumb position on the knob, determining movement of the detected finger and thumb on the knob, and controlling an end-use device in response to the determined finger and thumb movement.

In accordance with still another aspect of the present invention, a method is provided for controlling a touch-type control knob comprising the steps of detecting finger position on the control knob, measuring finger spacing on the control knob, determining thumb location on the control knob in response to position and width, determining a user's left or right hand based on thumb location and finger position on the control knob, and controlling an end-use device in response to determined user's hand and finger and thumb movement.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION

Figure 1:
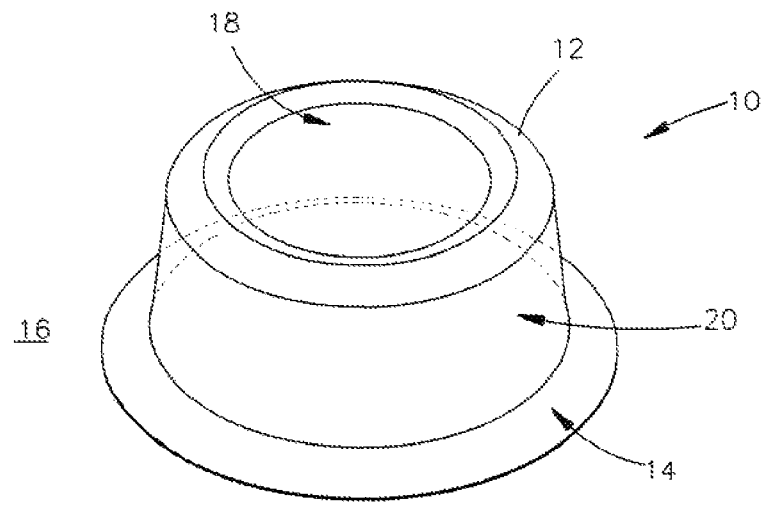
FIG. 1 is a perspective view of a touch-type control knob made in accordance with one example embodiment of the present invention.
Figure 2:
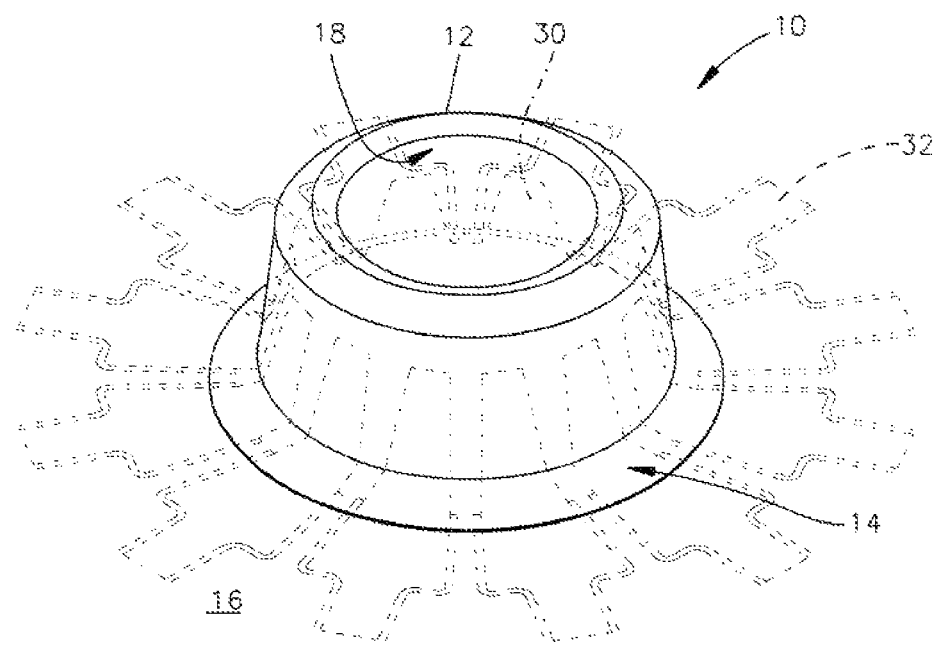
FIG. 2 is a perspective view of the touch-type control knob of FIG. 1 depicting the sensor elements within the structure of the assembly.
Figure 3:
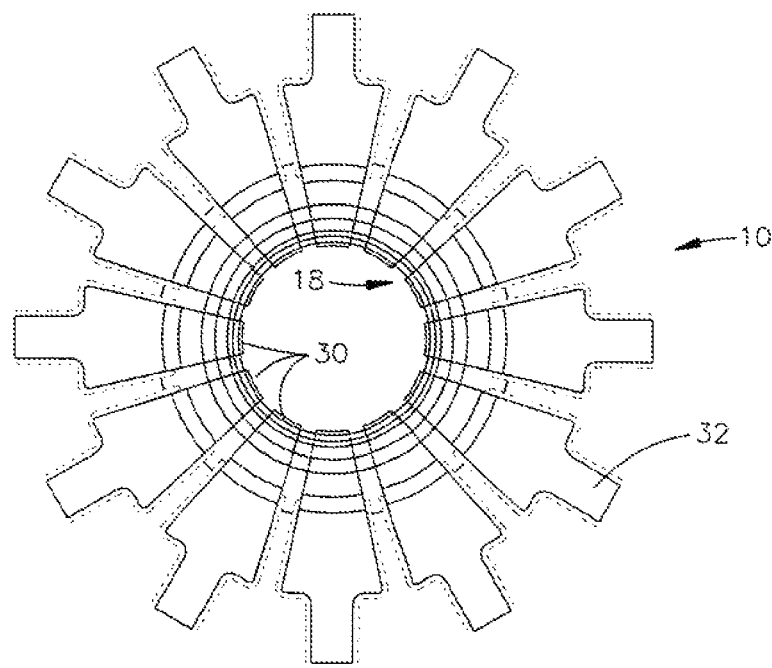
FIG. 3 is a bottom view of the touch-type control know of FIG. 1 with portions of the assembly material removed to show the sensor elements.

Referring to FIGS. 1-3, a touch-type control knob 10, made in accordance with one example embodiment of the present invention is shown. The control knob 10 is circular in shape having a cylindrical wall portion 12 extending outwardly from a base 14. The base 14 is adapted so as to be attachable to a wall surface 16 in any appropriate manner such as glue, screws, rivets, etc. The touch-type control knob 10 is not a movable knob but is responsive to touch.

The cylindrical wall 12 is of a predetermined thickness so as to have an inner wall 18 having an inner diameter and an outer wall 20 having outer diameter. The inner diameter of the inner wall 18 is large enough to accommodate an average human finger tip and allow the finger tip to move around in a circular fashion against the inner wall 18 of the control knob 10.

Between the inner wall 18 and the outer wall 20 and circumferentially spaced around the diameter of the cylindrical wall 12 are a plurality of capacitive sensors 30. Each capacitive sensor 30 is slightly circumferentially spaced from the next adjacent sensors on each side so as to be electrically isolated therefrom. The capacitive sensor elements 30 form an array of sensor elements spread around the circumference of the inside wall 18 of the sensor knob 10. Each sensor element 30 has a connector end 32 that is connectable to processing circuitry for detection of the presence of a finger or thumb on either the interior wall 18 or the exterior wall 20 of the sensor knob 10.

In the application of the sensor knob 10 to a vehicle, the sensor knob 10 may be located near a central front cabin location between the driver and passenger. When a either the driver or passenger grab the knob, a control process, in accordance with an example embodiment of the present invention, detects the location of each finger and thumb and determines if it is a right hand or left hand. This left hand or right hand determination is used to determine if the control knob user is the driver or the passenger.

Figure 4:
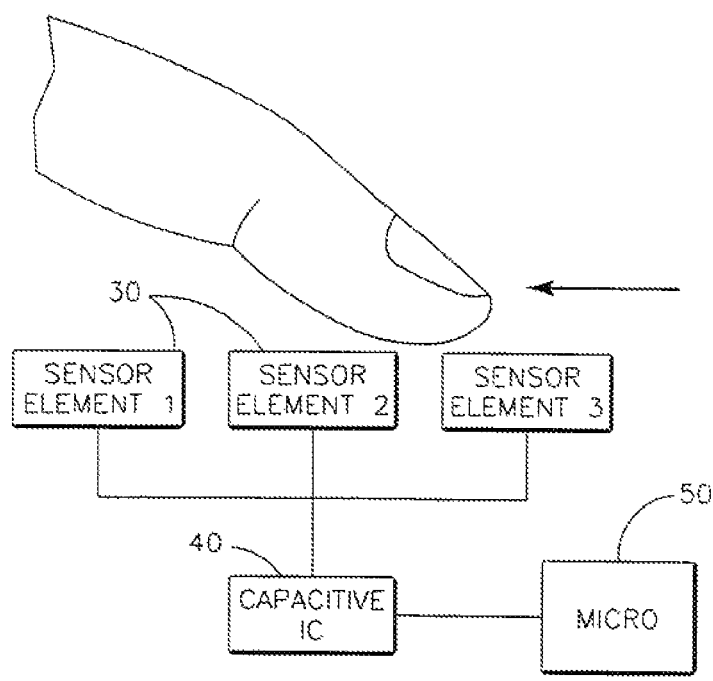
FIG. 4 is a schematic illustration of an operators finger being drawn across sensor elements of the touch-type control knob of FIG. 1 and the processing circuitry connected to the sensor elements.

Referring to FIG. 4, the sensors 30, which are metal strips, are connected to a capacitive sensor integrated circuit 40 so that each sensor functions as a capacitive sensor since the user's finger acts as a dielectric. Each capacitive sensor output is connected to a microprocessor or microcomputer 50 for processing of the sensor output signals. In accordance with one example embodiment the present invention, when a user's thumb and fingers are slide around the outside surface of the control knob 10, various ones of the sensors 30 provide and output signal to the microcontroller 50. The microcontroller tracks a specific pattern of motion (finger moving) or stationary point of contact (thumb), and determines the user's hand angular position around the control knob 10. Using this data, the microcontroller determines if the user is rotating the knob clockwise or counterclockwise. Position data can also be used to determine speed of rotation. The speed of rotation as a user's releases the knob can be used to provide a "flick-and-spin" type function. Such information can be used to quickly advance through selections in menus.

Sensor data can also used to determine when the user grabs the control knob 10 and when the user releases the control knob. The microcontroller can also decode the sensor data to detect a "tap" function where the user makes a selection by "tapping" their index finger while holding the knob. This tap can be used as a selection feature.

Figure 5:
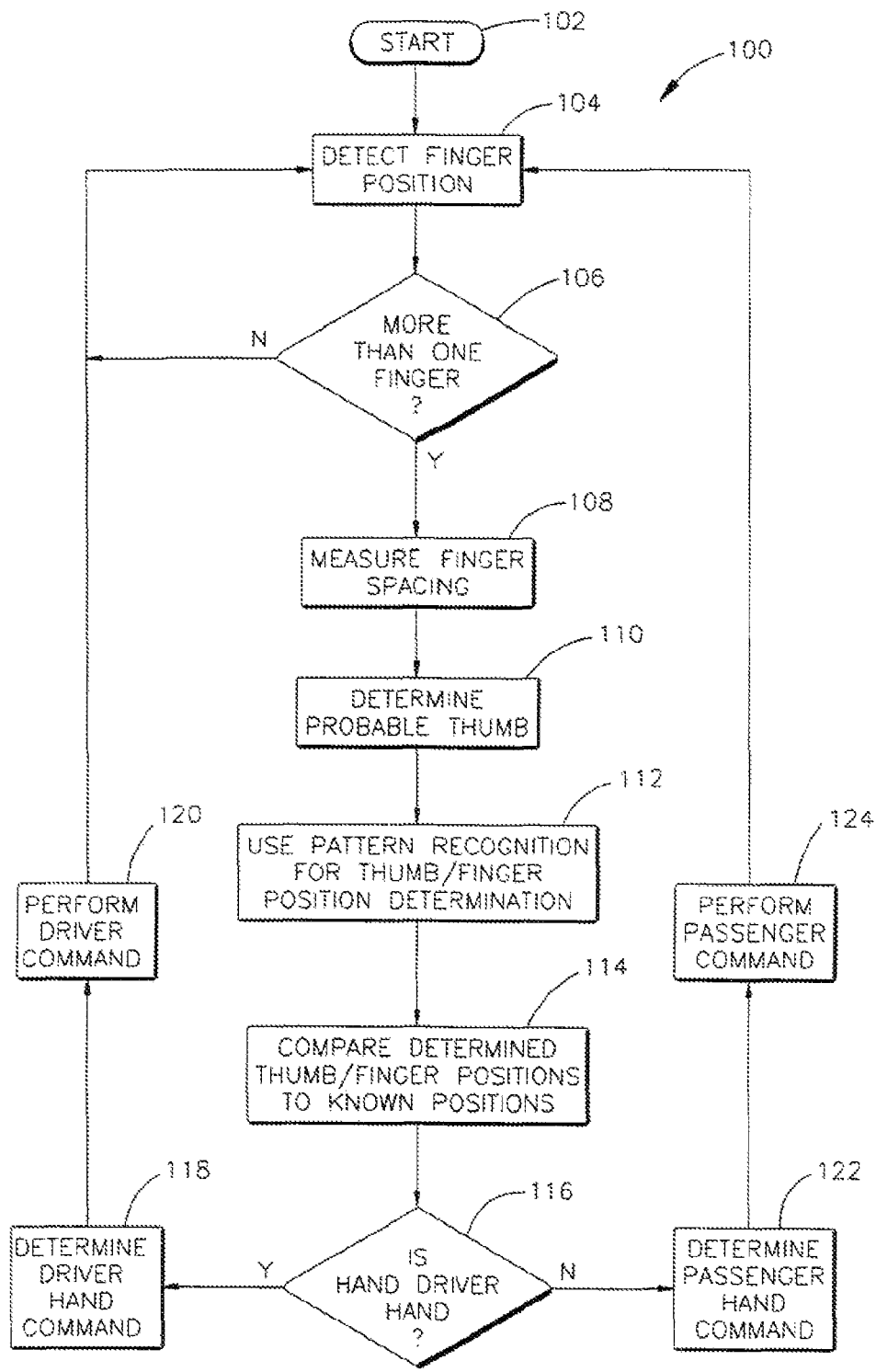
FIG. 5 is a flow diagram of a control process in accordance with one exemplary embodiment of the present invention for use with a touch-type control knob.

Referring to FIG. 5, a control process 100, in accordance with one exemplary embodiment of the present invention, for use with a touch-type control knob, such as that described above with regard to FIGS. 1-4 is shown. In step 102, the process starts and internal memories are cleared, initial flag conditions are set, etc. In step 104, the outputs of the sensor elements are monitored so as to detect finger position(s) on the control knob 10. In step 106, a determination is made as to whether more than one finger has been detected on the control knob 10. In accordance with this present control process, the control knob 10 and control process are design not to respond to touches to the control knob 10 unless there is a detection of more than one finger touching the knob 10. This insures that an inadvertent touch of the control knob 10 will not result in a change to the device the control knob is ultimately controlling such as a radio, heater system, etc. If the determination in step 106 is negative, the process loops back to step 104. When the determination in step 106 is affirmative, the process proceeds to step 108.

In step 108, the finger spacing on the control knob 10 is measured. In step 110, a determination is made from the measurements in step 108 as to the probable location of the thumb location touching the control knob 10 based upon the finger position, width and distance from the other fingers. Based on these factors and predetermined empirical information, thumb location is determined.

In step 112, a thumb finger pattern is developed based on the probable thumb determination in step 112. Now knowing the thumb location, other monitored contact points indicated other finger locations. These finger locations can then be used relative to the thumb location to develop a recognized pattern that may be based on empirical data or upon calculation. In step 114, the thumb/finger pattern determined in step 112 is then compared against a plurality of known thumb/finger patterns stored in memory to determine if a match can be made. A determination is then made in step 116 as to whether the pattern match is that of the drivers hand.

If the determination in step 116 is affirmative, the process proceeds to step 118 where the finger movement on the control knob 10 is monitored so as to determine the driver's hand command. In step 120 the requested command via the control knob 10 is performed, e.g., turn the radio volume up. The process then loops back to step 104.

If the determination in step 116 is negative, the process assumes that the hand is that of the passenger and the proceeds to step 122 where the finger movement on the control knob 10 is monitored so as to determine the passengers hand command. In step 124, the requested command via the control knob 10 is performed, e.g., turn the radio volume down. The process then loops back to step 104.

From the above description of the invention, those skilled in the art will perceive improvements, changes and modifications. The control knob of the present invention and the control process in accordance with the present invention can be used to replace any present mechanical rotary control knob whether in a vehicle system or any non-vehicle system. Improvements, changes and modifications within the skill of the art are intended to be covered by the appended claims.

Having described the invention, the following is claimed:

1. A touch-type control knob comprising:
   a base;
   a cylindrical wall extending from the base, said cylindrical wall having an interior surface and exterior surface accessible to a user;
   a plurality of capacitive sensor elements circumferentially spaced around said cylindrical wall, said plurality of capacitive sensors elements arranged so as to permit capacitive coupling at both the interior and exterior surfaces of the cylindrical wall; and
   processor circuitry connected to said plurality of capacitive sensor elements for controlling an end-use device, said processor circuitry sensing user touch commands in response to the capacitive coupling between the user and any of the plurality of capacitive sensor elements through at least one of the interior surface of the cylindrical wall and the exterior surface of the cylindrical wall and determining user desired commands based on the sensed user touch commands.

2. The control knob of claim 1 further comprising a controller, wherein said controller is configured to detect at least two fingers positioned on the control knob in response to the capacitive coupling between the plurality of capacitive sensor elements and the at least two fingers of the user.

3. The control knob of claim 2 wherein the processor circuitry is further configured to:
   measure spacing between the at least two fingers of the user on the control knob;
   measure a relative width of each of the at least two fingers of the user on the control knob; and
   determine a thumb location and another finger location of the at least two fingers of the user on the control knob based on a width of the thumb relative to the width of the other finger.

4. The control knob of claim 3 wherein said control knob is mounted between a driver location and a passenger location of a vehicle and wherein said processor circuitry further determines if the user is a driver or a passenger based on whether the processor circuitry has determined a right hand or a left hand of the user is on the control knob.

5. The control knob of claim 3 wherein the processor circuitry is further configured to determine whether a left hand or a right hand of the user is used based on the determined thumb location and the other finger location, wherein said determining the right hand is based on the determined thumb location being located closer to a driver seat of a vehicle and the determined other finger location being located farther from the driver seat of the vehicle.

6. A method for controlling a touch-type cylindrical control knob comprising steps of:
   detecting positions of at least two fingers of a user on at least one of an interior cylindrical surface and an exterior cylindrical surface of the control knob;
   measuring spacing between the at least two fingers of the user on the control knob;

measuring a relative width of each of the at least two fingers of the user on the control knob;

determining a thumb location of the user on the control knob based on the width of one finger of the at least two fingers relative to the width of the other finger of the at least two fingers of the user;

determining if the user is using a left or right hand on the control knob based on the determined thumb location and the at least two fingers positions on the control knob; and controlling an end-use device in response to the determined user's hand and the at least two fingers's positions and the thumb's location of the user on the control knob.

7. The method for controlling the knob of claim 6 further including the steps of mounting the knob between a driver location and a passenger location of a vehicle and determining if the user is a driver or a passenger.

8. The method for controlling the touch-type control knob of claim 6 wherein the steps of detecting positions of the at least two fingers of the user finger position on the control knob, measuring spacing between the at least two fingers of the user on the control knob, and determining the thumb location of the user on the control knob each include a step of monitoring a dielectric affect of the at least two fingers and the thumb.

9. The method for controlling the touch-type control knob of claim 6 further including a step of determining speed of movement of the detected positions of the at least two fingers and the thumb location on the knob.

10. The method for controlling the touch-type control knob of claim 6 wherein the steps of controlling the end-use device further comprises a step of selecting a control function in response to a detected finger tap on the control knob from a first finger while contacting the control knob with a second finger.

11. The method for controlling the touch-type control knob of claim 6 further comprising the steps of:

comparing the determined thumb location and the at least two fingers's positions on the control knob with a stored thumb location and finger position data; and identifying a given user based on a match between the determined thumb location and the at least two fingers's positions on the control knob and the stored thumb location and the finger position data of the given user.

\* \* \* \* \*